United States Patent [19]

Wada et al.

[11] Patent Number: 4,659,606

[45] Date of Patent: * Apr. 21, 1987

[54] SUBSTRATE MEMBERS FOR RECORDING DISKS AND PROCESS FOR PRODUCING SAME

[75] Inventors: Toshiaki Wada, Takatsuki; Yoshiaki Katsuyama, Muro, both of Japan

[73] Assignee: Sumitomo Special Metals Co., Ltd., Osaka, Japan

[*] Notice: The portion of the term of this patent subsequent to Aug. 26, 2003 has been disclaimed.

[21] Appl. No.: 727,740

[22] Filed: Apr. 26, 1985

[30] Foreign Application Priority Data

Apr. 27, 1984 [JP] Japan .................................. 59-85655

[51] Int. Cl.$^4$ ............................................... G11B 5/82
[52] U.S. Cl. ................................... 428/141; 427/129; 427/130; 427/131; 427/331; 428/336; 428/472; 428/693; 428/694; 428/900; 204/192.15; 204/192.23
[58] Field of Search ............... 428/693, 694, 900, 141, 428/472, 336; 204/192 C, 192 D, 192 M, 192 SP; 427/331, 128, 129, 130, 131

[56] References Cited

U.S. PATENT DOCUMENTS

| | | | |
|---|---|---|---|
| 3,470,020 | 9/1969 | Boudreaux et al. | 427/129 |
| 3,681,225 | 8/1972 | Genma et al. | 427/129 |
| 3,764,507 | 10/1973 | McKinnon et al. | 204/192 D |
| 4,307,156 | 12/1981 | Yanagisawa | 428/694 |

*Primary Examiner*—Paul J. Thibodeau
*Attorney, Agent, or Firm*—Burns, Doane, Swecker & Mathis

[57] ABSTRACT

A substrate member for recording disks comprises a sputtered film of $Al_2O_3$, $SiO_2$ and/or $Si_3N_4$ on the surface of an alumina base ceramic material having therein micropores of no more than 5 microns and a relative theoretical density of no less than 96% said sputtered film having a surface roughness of no more than 80 angstroms, being substantially pore-free and strain-free on the surface, and having a thickness of 0.3 to 30 microns.

17 Claims, 4 Drawing Figures

SUBSTRATE MEMBERS FOR RECORDING DISKS AND PROCESS FOR PRODUCING SAME

FIELD OF THE INVENTION

The present invention relates to a substrate member for recording disks, particularly magnetic recording disks, having a void-free and strain-free surface layer as well as an improved surface roughness, and to a process for producing same.

BACKGROUND

In general, the substrate members (or substrates) for magnetic recording disks are required to possess the following properties that:

1. They have an improved surface roughness after polishing so as to achieve stable floating of magnetic heads and stable recording properties in association with a head floating height of as low as 0.3 micron or less.

2. They are free from any projections or pinhole-like indents which are essentially attributable to the deficiency of the magnetic thin film formed on the surface of the substrate.

3. They have mechanical strength sufficient to withstand machining, polishing or high-speed rotation during use.

4. They have corrosion, weather and heat resistance.

Hitherto, the substrates for magnetic disks have made use of aluminum alloys. However, the Al alloy materials only provide insufficient substrate materials for high-density magnetic recording disks due to the unfavorable surface state of the substrate which includes protrusions, indents and wave-like configuration. Namely, in the Al alloy materials, the crystal anisotropy, material deficiency and non-metallic inclusions thereof remain on the surface of the substrates to give rise to protrusions or indents upon machining and/or polishing whereupon certain hard spots fall away from the substrates to leave behind indents, so that polishing only results in a surface roughness of at most about 200 angstroms.

The machined quality of magnetic disk substrates directly affects the run-outs and acceleration component caused by the magnetic recording disks, the signal error of magnetic recording media, and the like.

As the Al alloys are metallic materials, they have a Vickers hardness on the order of Hv 100 (that of ceramics is more than 600) and a bending strength on the order of 1000 kg/cm$^2$ (that of ceramics is more than 4000 kg/cm$^2$). For that reason, more stringent limitations are now imposed upon the dimensional accuracy stipulated in respect of scratch, flaw, smoothness and wave configuration as the recording density increases, and involve more difficulty in machining. Machining using abrasive grains also causes incidental packing of abrasive particles, which entails another problem. In the case of the Al alloy substrates, also a great deal of care should be taken of the cleanness, rust prevention, contamination, etc. in the production steps inclusive of lathe turning and polishing and in the storage period in order to secure the surface corrosion and weather resistance thereof and the prevention of the surface contamination thereof.

For the purpose of improving the Al alloy substrates, it has been known to form a film with a high hardness on the surface thereof. As an example, it has been proposed to form an alumite layer on the surface of Al alloys, thereby increasing hardness, in order to improve abrasive machinability. However, traces of impurities (Fe, Mn, Si) contained in the Al alloys precipitate as intermetallic compounds during the formation of alumite, which are responsible for the occurrence of the indent deficiency after the alumite treatment. It is extremely difficult to further improve the purity of mother alloys in view of the production process. In addition, the Al alloys causes a handling problem in view of corrosion resistance and cleanness. Furthermore, the production of thin film magnetic recording media by plating or sputtering poses problems in connection with the occurrence of chemical reactions and diffusion between the Al alloys and the magnetic films. In some cases, it is required to apply a heat treatment to the magnetic films depending upon the type of steps applied. However, such a heat treatment will readily cause deformation and lowering of the dimensional accuracy of the Al alloy substrates, simultaneously causing increases in the surface vibration and acceleration. Thus, it is difficult to apply that treatment.

Although there is available a method for forming oxides such as $SiO_2$, $Al_2O_3$ and the like on the Al substrates by sputtering, this method is disadvantageous in that the adhesion of the Al substrate to the sputtered oxides is weak.

Ceramic materials have become to be widely used in various fields due to their superiority over the Al alloy base disk substrates in respect of heat resistance, wear resistance, weather resistance, and insulation and mechanical strength. In the substrates for magnetic disks having recording media treated on the substrate surface, however, there is a strong demand for the surface thereof to be freed of any holes and strain in association with the thinning and high-densification of the recording media.

Generally, the methods for producing ceramic substrates embrace single crystallization; forming with a mold, rubber press, doctor blade, etc. followed by sintering; and hot pressing (HP process) as well as hot isostatic pressing (HIP process) for obtaining a high density. However, the single crystallization is not only high in the production cost, but also encounters difficulty in the production of any substrates having an increased diameter. On the other hand, although it is possible to produce highly densified substrates by the HIP or HP processes, yet there arise certain reliability problems such as the occurrence of drop-outs, head crush, etc. due to the minute surface deficiency (micropores of 5 microns or less) of the resulting substrates, where they are used for magnetic recording disks.

In general, the mechanochemical polishing method, which is applicable to the disk substrates, etc. as the surface polishing method, has been known ones to finish the surface of Si substrates, GGG crystals, ferrite, etc. without incurring deterioration of the surface physical properties thereof. However, where the mechanochemical polishing method is applied to ceramic materials in which micropores exist, such pores are exposed to open on the surface, resulting in that they only provide insufficient substrates for magnetic disks. Where the mechanochemical polishing method is applied to the alumina base ceramic materials, on the other hand, it is likely that exposure of micropores takes place simultaneously with the occurrence of a stepwise surface difference between crystals due to the difference in the rate of chemical erosion on the different surfaces of component grains or crystal grains.

SUMMARY OF THE DISCLOSURE

The present invention has for its objects to obtain novel substrate members for recording disks, particularly magnetic recording disks, which are based on ceramic materials, and reduce or eliminate the drawbacks of the prior art, and to provide a process for the production thereof.

According to the basic characteristic features of the present invention, there is provided an alumina base ceramic substrate having a substantially pore-free and strain-free layer finished to a surface roughness of no higher than 80 angstrom (preferably no higher than 20 angstroms) with a view to improving the properties, and assuring the reliability, of a recording (e.g., magnetic recording) film formed on the surface thereof, and a process for the production thereof. The recording film typically comprises a magnetic recording film or films, however, may be an optical recording film or the like recording films, generally.

More specifically, the substrate for recording disks according to the present invention is characterized by a sputtered film formed on the surface of an alumina base ceramic material having therein micropores of no more than 5 microns and a relative theoretical density of no less than 96%, the sputtered $Al_2O_3$, $SiO_2$ and/or $Si_3N_4$ film having a surface roughness of no more than 80 angstroms, being of substantially pore-free and strain-free on the surface, and having a thickness of 0.3 to 30 microns.

The process for producing substrate members for magnetic disks according to the present invention is characterized in the steps:

forming a film of $Al_2O_3$, $SiO_2$ and/or $Si_3N_4$ having a thickness of 0.5 to 35 microns by sputtering on the surface of alumina base ceramic material including therein minute pores of no more than 5 microns and having a relative theoretical density of no less than 96%, and polishing the surface of said film under a load of 0.05 to 2 $kg/cm^2$ with a suspension in which 0.1 to 20% by weight of a fine powder of no larger than 0.1 micron comprised of at least one of $SiO_2$, MgO, $Al_2O_3$, $CeO_2$ and $Fe_2O_3$, each of 99% purity or more is suspended in pure water, until obtaining a substantially pore-free and strain-free surface layer having a thickness of 0.3 to 30 microns and a surface roughness of no more than 80 angstroms.

The term "polishing" used herein generally has a broad meaning embracing, e.g., lapping or buffing or the like finishing process such that uses loose fine abrasives or powders in the wet state.

In the following the present invention will be described based on embodiments of the magnetic recording disks for the illustrative purpose.

BRIEF DESCRIPTION OF THE DRAWINGS

The foregoing and other objects and features of the present invention will become apparent from the following detailed description with reference to the accompanying drawings, which are given for the purpose of illustration, and in which.

PREFERRED EMBODIMENTS

Figure 1A:
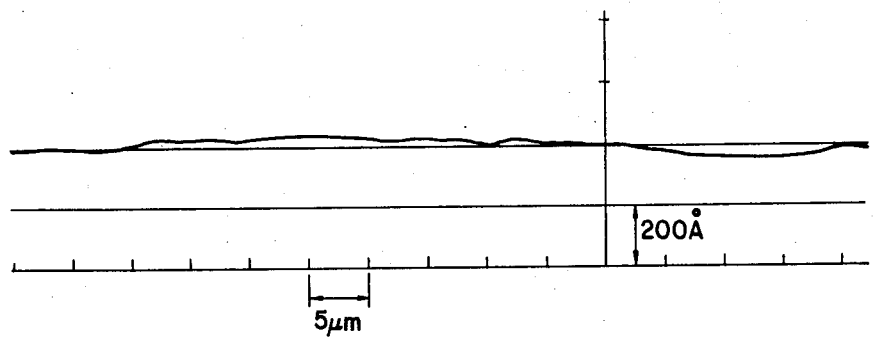
FIGS. 1A and 1B as well as 2A and 2B are graphs showing the results of measurement of the surface state of Examples 1 and 2 of the present invention, A indicating the surface of the sputtered films after polishing, and B shows the surface of alumina materials.

In consequence of various studies made by the present inventors, it has been found that improvements and assurance in and of the properties and reliability of the recording film to be formed on the substrate can be achieved through the following measure:

As an insulation layer between the surface of an alumina base ceramic material and an upper film to be deposited, said material including on the surface micropores of no more than 5 microns (preferably 3 microns) and having a relative theoretical density of no less than 96%, a thin film of $Al_2O_3$, $SiO_2$ and/or $Si_3N_4$ having a thickness of 0.5 to 35 microns is formed on the surface thereof by sputtering, and the surface of said film is polished under a load of 0.05 to 2 $kg/cm^2$ with a suspension in which of 0.1 to 20% by weight of a fine powder comprised of at least one of $SiO_2$, MgO, $Al_2O_3$, $CeO_2$ and $Fe_2O_3$, each of 99% purity or more is suspended in 0.1 to 20% by weight of pure water. The fine powder should be of the grain size no more than 0.1 micron. The polishing is conducted to such an extent that the intermediate thin film becomes ones having a thickness of 0.3–30 microns and a surface roughness of 80 angstrom or less (preferably 50 angstrom or less, most preferably 20 angstroms or less), and having a surface of substantially no pore and no strain.

The alumina base ceramic materials in the present invention comprise $Al_2O_3$ and those containing $Al_2O_3$ as the main (e.g., no less than 50% by weight preferably 65% or more, most preferably 96% or more) component such as $Al_2O_3-TiC$, $Al_2O_3-TiO_2$, $Al_2O_3-Fe_2O_3-TiC$ and the like systems. Preferably, these materials are obtained by the forming (or compacting) process such as molding, rubber pressing and doctor blade processes and sintering with the hot pressing (HP) process or the hot isostatic pressing (HIP) process. It is to be understood that the alumina base ceramic materials may contain known grain growth inhibitors such as MgO, NiO, $Cr_2O_3$, etc., and other sintering aids, and the mean crystal grain size of alumina should preferably no higher than 5 microns. It is also to be noted that there are now commercially available alumina base ceramic materials of one of the general grades expressed in terms of the density of no less than 96%.

According to the present invention, if the alumina base ceramic substrate includes on the surface pores exceeding 5 microns, the formation and polishing of the sputtered film require a longer period of time. Thus, the micropores need to be of a size of no larger than 5 microns (preferably no larger than 3 microns). The thickness of the sputtered $Al_2O_3$, $SiO_2$ and/or $Si_3N_4$ film, which are to be formed on the alumina base ceramic material in the present invention, may be selected depending upon the respective purposes. However, in a thickness below 0.5 microns, the films cannot be polished on the surface by the mechanochemical polishing process (the MCP process) so as to obtain the required surface roughness and make them substantially pore-free and strain-free. In a thickness exceeding 35 microns, on the other hand, sputtering should be done for a prolonged period of time, and some strain may possibly occur within the substrate due to the internal stress occurring in the films. For such reasons, the film thickness should be in a range of 0.5 to 35 microns, preferably 15 to 25 microns. For similar reasons and with the polishing allowance in mind, the sputtered films after poishing should have a thickness in a range of 0.3 to 30 microns (preferably 10 to 20 microns).

In the present invention, the fine powder of finely divided $SiO_2$, $MgO$, $Al_2O_3$, $CeO_2$ or $Fe_2O_3$ particles is suspended in pure water according to the condition for the MCP process. However, a particle size exceeding 0.1 micron is unpreferred, since the sputtered films may then be bruised or scratched on the surface after polishing with the resulting deterioration of the surface roughness. The amount of the fine powder to be added into pure water should be in a range of 0.1 to 20% by weight. This is because no significant polishing or lapping effect is obtained in an amount of less than 0.1% by weight, while, in an amount of exceeding 20% by weight, hydration heat tends to be generated from the respective particles, or gelation tends to take place easily, and an increase in the activity results in deterioration of the surface state. The term "pure water" used herein refers to water freed of metal ions, contaminants, esp., organic contaminants, inorganics and suspended matters, and may embrace ion exchanged water, distilled water, etc.

It is preferred to employ a lapping machine for the MCP process. Most suitably, the lap to be used in the present invention should be of soft metals such as Sn soldering alloys or Pb, or hard cloth, etc. When the lapping load is below 0.05 kg/cm², the required surface roughness is not obtained with a drop of machining efficiency. On the contrary, a lapping load exceeding 2.0 kg/cm² is unpreferred, since there is then a drop of polishing accuracy even though it provides a high machining speed.

Where the substrate of the present invention is used as a dual side magnetic disk both sides of which are used for recording, the film is formed on each side of the alumina base ceramic materail by sputtering, and both films are simultaneously subjected to MCP processing to counterbalance the internal stresses in both films, whereby a substrate member is obtained, which excels in smoothness and surface roughness, and is pore-free and strain-free.

As compared with Al alloys, the alumina base ceramic substrate member having thereon the sputtered films according to the present invention has a more improved mechanical strength, and is relatively easy to control the dimentional accuracy in the abrasive processing. Furthermore, no special care is necessary with respect to corrosion resistance and weather resistance. The surface contamination can be also removed by sputter cleaning, in the case where an additional insulating thin film is formed by sputtering.

Where Al alloys have been subjected to lathe turning or machining, there is left on their surface an affected layer, which is deteriorated by that machining. With the alumina base ceramic substrate member according to the present invention, on the contrary, no difference in bulk stress strain takes place on the surface, nor is strain transferred to the media to be coated on the substrate member.

In other words, according to the substrate member of the present invention, the sputtered layer or layers (the surface layer or layers) is or are substantially identical in the crystal structure uniformity with the substrate layer, just therebelow, (the alumina base ceramic material), so that the resulting surface layer has reduced or limited stress. By selection of the sputtering conditions, it is possible to form a film with compression stress therein. This gives a film which is difficult to peel from the substrate and crack, and excels in mechanical strength. The polishing process as employed in the present invention has made it possible to keep surface processing strain from occurring.

To use such magnetic disk substrate members renders it possible to produce high-density magnetic disk recording media of high reliability. In addition, that a ceramic material of the standard represented in terms of a relative theoretical density of no less than 96% can be used as the starting alumina base ceramic material offers an advantage in view of mass-production.

EXAMPLES

In what follows, the present invention will be explained with reference to the following non-restrictive examples.

EXAMPLE 1

As the substrate base material use was made of an $Al_2O_3$ ceramic material which was treated by HIP, included on the surface micropores of no higher than 5 microns, was 200 mm and 2 mm in diameter and thickness, and had a purity of 99.95%, a relative theoretical density of 97% and a mean crystal grain size of 4 microns. That base material was precisely polished on the surface to a surface roughness (cut-off of 0.2 mm, the same applies hereinbelow if not otherwise specified) of no higher than 200 angstroms by the precise lapping process. Thereafter, with a high-frequency sputtering device, sputtering was effected using as the target plate an $Al_2O_3$ plate of 350 mm in diameter, 6 mm in thickness and 99.9% purity, after an Ar pressure of $1\times10^{-6}$ mbar had been reached through evacuation. For the cleaning of the base material surface, the surface layer was removed by a thickness of about 500 angstroms by reverse sputter cleaning prior to normal sputtering.

The power applied for normal sputtering was 5.5 kW. A negative bias voltage ($-100$ V) was exerted to the base material. The resulting bias effect gives rise to a step coverage for the ceramic pore portions, so that $Al_2O_3$ is also deposited onto such portions. In this connection, it is noted that the internal stress in the film was a compression stress of $5\times10^8$ dyn/cm², and the sputtered film had a surface rough-ness of 500 angstroms. In the conventional sputtering process of oxides, the rate of sputtering was so slow that film-forming required a prolonged period of time. However, with the arrangement of an inter-electrode distance of as small as 40 mm and by the application of a large power, the rate of sputtering reached 500 angstroms/min., and the time required for forming a film of 20 microns was reduced to 400 minutes.

The resultant sputtered film was MCP-finished on the surface to a surface roughness of 40 angstroms under a lapping load of 0.5 kg/cm² in a suspension obtained by suspending 5% by weight of finely divided $SiO_2$ particles of 0.01 microns in particle size in pure water, using a Sn lap as the lap. Then, the allowance was 3 microns, and the flatness was 1 micron.

Figure 1B:
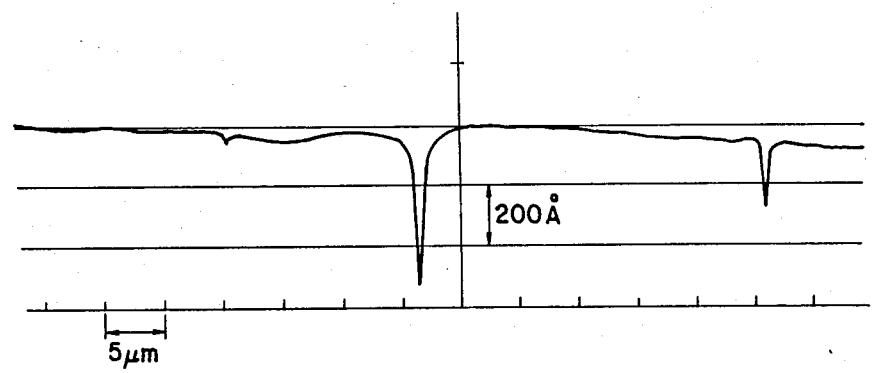

FIG. 1A illustrates the surface state of the invented sputtered film after MCP polishing, and FIG. 1B shows the surface state of the substrate base material prior to sputtering.

The surface states illustrated in FIG. 1 were determined with a thin film step difference meter wtih a stylus of 0.1 micron R in a diameter (Talystep).

From FIG. 1, it is evident that the micropores on the surface of the ceramic substrate base material have been removed by MCP of the sputtered film according to the present invention for finishing to a surface roughness of 40 angstroms.

To measure the adhesion of the film to the substrate base material, whether or not the $Al_2O_3$ film separated from the base material was measured with varied weights increasing successively from 50 g to 1000 g. As a result, it has been found that such separation do not take place up to a weight of 1000 g, which means that strong adhesion has been achieved.

EXAMPLE 2

As the substrate base material use was made of $Al_2O_3$-TiC base ceramic materials (with the mean crystal grain size of alumina being 4 microns), which was HIP-treated, included on the surface micropores of no higher than 3 microns, was 100 mm in diameter and 2 mm in thickness, and contained 65% by weight of $Al_2O_3$. That base material was precisely polished to a surface roughness of 200 angstroms. Thereafter, with a high-frequency sputtering device as is the case with Example 1, the base material was sputtered using as the target plate $SiO_2$ of 350 mm in diameter, 6 mm in thickness and 99.9% purity, otherwise under the same conditions as in Example 1, whereby a $SiO_2$ film of a surface roughness of about 300 angstroms was formed on the base material to a thickness of 15 microns. The film-forming time was 100 minutes. The thus formed film was MCP-finished to a surface roughness of 40 angstroms under a lapping load of 0.5 kg/cm$^2$ in a suspension obtained by adding 2% by weight of finely divided MgO powders of a particle size of 0.02 microns in pure water, and using hard cloth as the lap, wherein the allowance was 5 microns.

Figure 2A:
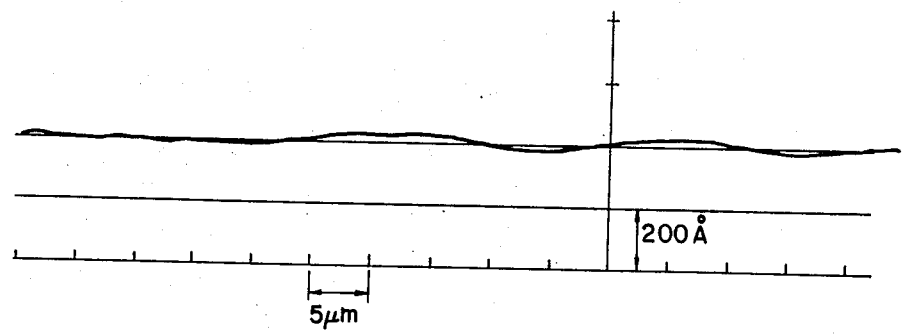
Figure 2B:
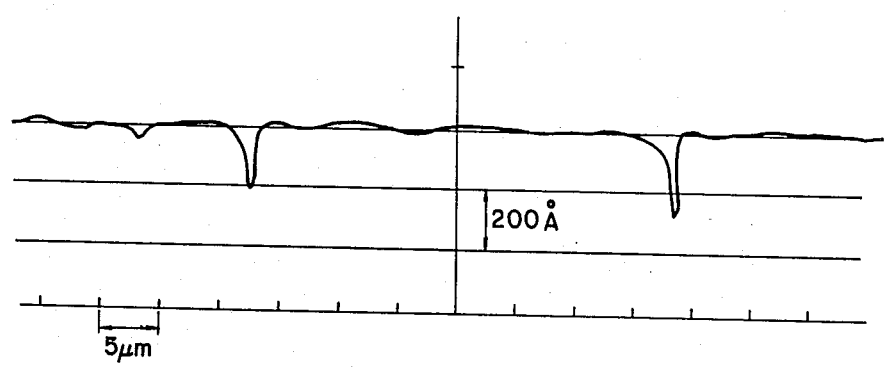

FIG. 2A illustrates the surface state of the sputtered film after MCP according to the present invention, and FIG. 2B shows the surface state of the substrate base material prior to sputtering.

The surface state was measured with the thin film step difference meter identical with that used in Example 1. Like Example 1, it is evident from FIG. 2 that the micropores on the surface of the ceramic base material have been removed by MCP applied to the sputtered film according to the present invention for finishing to a surface roughness of 40 angstroms.

As mentioned in the foregoing, the present invention is effective in preventing a lowering of element yields attributable to substrate deficiencies as well as assuring and improving the properties and reliability of the recording film (particularly magnetic recording film) deposited on the surface of the pore-free substrate member.

It should be understood that the present invention should not be interpreted to cover only the disclosed embodiment and features and modifications may be made without departing from the gist of the present invention as disclosed and claimed hereinbelow.

What is claimed is:

1. A substrate member for recording disks comprising a sputtered film formed of at least one member selected from the group consisting of $Al_2O_3$, $SiO_2$, and $Si_3N_4$ on the surface of an alumina base ceramic material having therein micropores of no more than 5 microns and a relative theoretical density of no less than 96%, said sputtered film having a surface roughness of no more than 80 angstroms, being substantially pore-free and strain-free on the surface, and having a thickness of 0.3 to 30 microns.

2. A process for producing substrate members for recording disks comprising the steps:
providing a film having a thickness of 0.5 to 35 microns by sputtering at least one member selected from the group consisting of $Al_2O_3$, $SiO_2$, and $Si_3N_4$ on the surface of an alumina base ceramic material having therein micropores of no more than 5 microns and a relative theoretical density of no less than 96%, and
polishing the surface of said film under a load of 0.05 to 2 kg/cm$^2$ with a suspension of 0.1 to 20% by weight of a fine powder of no larger than 0.1 micron of at least one of $SiO_2$, MgO, $Al_2O_3$, $CeO_2$ and $Fe_2O_3$, each of 99% purity or more in pure water, until a substantially pore-free and strain-free surface layer having a thickness of 0.3 to 30 microns and a surface roughness of no more than 80 angstroms is obtained.

3. A substrate member as defined in claim 1, wherein said alumina base ceramic material includes at 50% by weight of $Al_2O_3$.

4. A substrate member as defined in claim 3, wherein said alumina base ceramic material includes at least 65% by weight of $Al_2O_3$.

5. A substrate member as defined in claim 4, wherein said alumina base ceramic material includes at least 96% by weight of $Al_2O_3$.

6. A substrate member as defined in claim 1, wherein said alumina base ceramic material includes micropores of no largA substrate member as defined in claim 1, wherein said film is 10-20 microns thick.

10. A substrate member as defined in claim 1, which has said film on both sides of the substrate member.

11. A substrate member as defined in claim 1, wherein said film has compression stress therein.

12. A process as defined in claim 2, wherein said polishing is effected through the mechano-chemical polishing.

13. A process as defined in claim 12, wherein said mechano-chemical polishing is effected by lapping.

14. A process as defined in claim 2, wherein said film is provided on both sides of the alumina base ceramic material and said polishing is conducted simultaneously to both films.

15. A recording disk comprising the substrate member as defined in claim 1.

16. A recording disk comprising the substrate member produced by the process as defined in claim 2.

17. A recording disk as defined in claim 15 or 16, which has a magnetic recording film directly or indirectly provided on the surface of said substrate member.

* * * * *